Jan. 23, 1951 J. S. LIGHT 2,539,145
FOREHEARTH TEMPERATURE CONTROL
Filed Oct. 1, 1946 3 Sheets-Sheet 1

Fig. I.

INVENTOR
JOHN S. LIGHT
BY Parham + Bates
ATTORNEYS

Jan. 23, 1951  J. S. LIGHT  2,539,145
FOREHEARTH TEMPERATURE CONTROL
Filed Oct. 1, 1946  3 Sheets-Sheet 2

INVENTOR
JOHN S. LIGHT
BY Parham + Bates
ATTORNEYS

Patented Jan. 23, 1951

2,539,145

UNITED STATES PATENT OFFICE 2,539,145

FOREHEARTH TEMPERATURE CONTROL

John S. Light, Simsbury, Conn., assignor to Hartford-Empire Company, Hartford, Conn., a corporation of Delaware Application October 1, 1946, Serial No. 700,485

3 Claims. (Cl. 49—77)

This invention relates generally to improvements in control systems for automatically regulating the temperature conditions of molten glass in a forehearth of a glass furnace, especially a forehearth that is provided with glass feeding means.

The present invention has particular application to a forehearth of the type comprising a cooling section, a "soaking" or homogenizing section, and a spout or feeding section. In this type of apparatus, molten glass at a high temperature may pass from a glass melting furnace to the forehearth cooling section wherein the glass normally cools or is cooled to some predetermined temperature. Under some conditions, more or less heat may be applied to the glass in the cooling section. In the spout and homogenizing sections regulable temperature influencing means may be provided in an attempt to establish temperature equilibrium in the glass before it flows to the spout outlet from which it may be fed to form suspended molten glass mold charges.

In the operation of a forehearth of the type described, an important factor is the regulation of the temperature influencing means in the spout and homogenizing sections to produce a uniform distribution of temperature in the glass being fed from the spout outlet. Failure to so regulate and maintain the temperature distribution results in adverse temperature variations in the discharged glass which may cause thin spots and other defects in the finished articles made from the glass by the forming machinery.

It is a general object of this invention to minimize or obviate rejection of finished articles because of defects resulting from a maldistribution of temperature in the glass or gobs fed from the outlet of a forehearth.

An object of the present invention is to provide a system for automatically maintaining at a predetermined value a temperature differential between glass leaving the homogenizing section and the glass adjacent to the outlet of the spout section of a glass feeder forehearth.

Another object of the present invention is to provide a method for obviating certain of the temperature variations of the glass entering a spout well from various portions of the spout section.

The details of an embodiment of the present invention will be described with reference to the accompanying drawings, in which.

Figure 2:
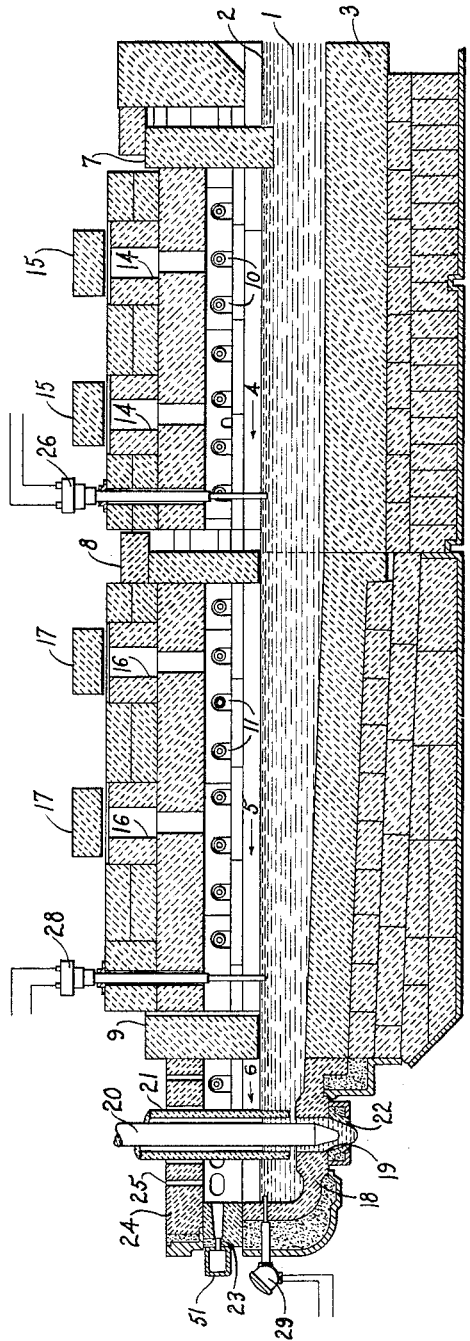
Fig. 2 is a vertical section on line 2—2 of Fig. 1, showing many of the details of that portion of the forehearth.

Referring first to Fig. 2, the forehearth shown is generally of the conventional type disclosed in U. S. Patent No. 2,139,911, issued to K. E. Peiler et al. on December 12, 1938. A supply body of glass, generally designated 1, is maintained at any desired level 2 by flow from a glass melting furnace (not shown). The body of glass is retained by a flow channel 3, the glass flowing from the melting furnace to a cooling section, generally designated 4, and thereafter to a heating or a homogenizing section, generally designated 5. The glass flows from the heating section to a spout, generally designated 6. A baffle or skimmer 7 depends into the molten glass coming from the melting furnace and acts as a baffle between the melting furnace proper and the cooling section. A baffle 8 acts as a dividing member between the cooling and homogenizing sections and is located in proximity to the glass level 2 but normally does not depend thereinto. A baffle 9 is provided according to the present invention to act as a dividing member between the homogenizing section and spout and, similar to baffle 8, is located in proximity to the glass level 2 but does not depend thereinto.

Figure 1:
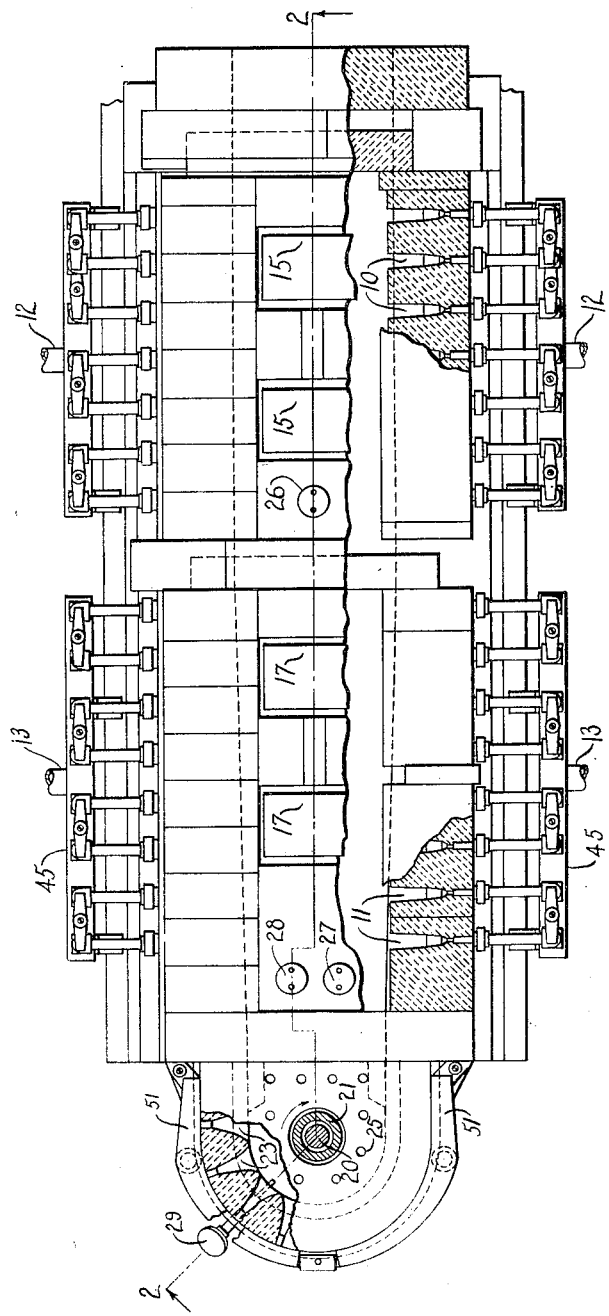
Fig. 1 is a plan view of a forehearth showing the cooling section, homogenizing section, spout and certain of the details of the feeder and temperature regulating equipment.

A plurality of gas burners and firing tunnels generally designated 10 is disposed along each of the side walls of the cooling section (Figs. 1 and 2). A plurality of gas burners and firing tunnels generally designated 11 is also disposed along each of the side walls of the homogenizing section. A mixture of combustible gas and air is fed to burners 10 by supply line 12; similarly, a combustible mixture is supplied to burners 11 by supply line 13 (Fig. 1). A plurality of exhaust outlets or flues 14 is provided in the upper portion of the cooling section. A plurality of damper members 15 is disposed in working relationship to flues 14 for controlling the egress of combustion products therefrom. A plurality of exhaust outlets or flues 16 is formed in a portion of the homogenizing section and have damper members 17 disposed in working relationship therewith.

The details of the forehearth, forehearth construction, flues, dampers and associated regulating means are not shown, being no part of the present invention and being readily obtainable from the prior art, having been particularly described in the United States patent hereinbefore cited.

Spout 6 comprises a boot 18 which is formed in its lower portion to define a well or pump chamber 19 (Fig. 2). A plunger 20 and its associated tube 21 depend vertically into the molten glass and are concentrically located relative to the walls of well 19. Tube 21 may be rotated continuously or intermittently and plunger 20 may be reciprocated vertically as is well known in the prior art. The result of the combined action of the plunger and tube is to control the discharge of glass from the boot through a feed orifice 22 so that the issuing glass will form successive suspended mold charge masses. A plurality of gas burners 23 is disposed around a portion of the periphery of the spout. Roof structure 24 of the spout may be provided with a plurality of vertical vent holes 25 (ten vent holes being used in the present embodiment) for venting the combustion products of burners 23.

Baffle 9 has been found to be effective in preventing the interference between the firing of the spout and homogenizing sections. The baffle tends to concentrate the heat of the spout burners 23 in the spout section thereby permitting the use of smaller spout burners or less spout insulation than has been used heretofore.

The general operation of the glass furnace and forehearth described thus far is as follows. The molten glass at high temperature enters the cooling section 4 after passing beneath the lower edge of skimmer 7. Usually, the glass is very hot as it leaves the glass melting furnace and must be cooled sufficiently before the glass is suitable for use in forming machines, although often, during the cooling period, heat may be supplied to the glass along the side walls of the cooling section. The cooling of the glass usually results from conductivity through the wall structure of the channel and by radiation to the roof. In some instances, positive cooling may be employed, as, for example, in the manner disclosed in U. S. Patent No. 2,144,973, granted January 24, 1939, to William T. Honiss. Heat may be supplied to the glass mass by operating burners 10. In conjunction with the operation of the burners, the exhaust flues 14 may be opened by a suitable adjustment of dampers 15. By suitable regulation of the burners and dampers, the glass may be brought to a desirable average temperature before it flows under baffle 8 into the homogenizing section. The purpose of the homogenizing section is to permit temperature differences in a glass mass to equalize so that by the time the glass flows under baffle 9 and enters spout 6, it will be in substantially uniform temperature equilibrium. This more or less uniform equilibrium is attained by suitable operation of burners 11 and manipulation of dampers 17 in a manner hereinbefore described with relationship to the cooling section. In the spout, the glass is given a rotary motion by the rotation of tube 21 and moves downward through well 19 under the influence of gravity, the downward flow being periodically accentuated and periodically retarded by the reciprocation of plunger 20. Thus, the glass has approximately a spiral motion approaching the well. Burners 23 in the spout section may be operated to vary the temperature of the glass therein to any desirable degree. The manner in which the present invention utilizes the temperature influencing means to automatically regulate the temperature conditions of the glass in the homogenizing section and spout will now be described.

Thermocouple 26 depends vertically into the molten glass within the cooling section. The thermocouple is connected to suitable equipment (not shown) which automatically regulates the operation of the burners 10 within the cooling section as is commonly known in the art. Two additional thermocouples 27 and 28 are provided in juxtaposition in a transverse vertical plane through the forward portion of the homogenizing section. An additional thermocouple 29 is inserted horizontally into the molten glass retained by boot 18 of the spout. The thermocouples used in this application may be of a variety of constructions, but, regardless of the type of construction used, must be suitably protected from the corrosive action of the molten glass and the gases above the glass level. This may be done satisfactorily by shielding the end portion of the thermocouple by a platinum shell or thimble. It is to be noted that no burners lie in the plane than contains thermocouples 27 and 28 or are in proximity thereto.

As will hereinafter be more fully described, thermocouple 27, in conjunction with a suitable system, maintains a predetermined temperature in the forward end of the homogenizing section by operating burners 11. Thermocouples 28 and 29 are connected in opposed polarity to a suitable system for maintaining the difference between the temperature of the glass in the forward end of the homogenizing section and the temperature of the glass in the spout at a predetermined value by the operation of burners 23. It is to be noted that thermocouple 29 should be suitably located so that it will be in contact with a certain portion of the glass flowing to the feeder well under the action of a feeder tube and plunger as will be more fully described hereinafter. It has been found desirable to place the junction of thermocouples 28 and 29 in the same horizontal level within the molten glass.

Figure 3:
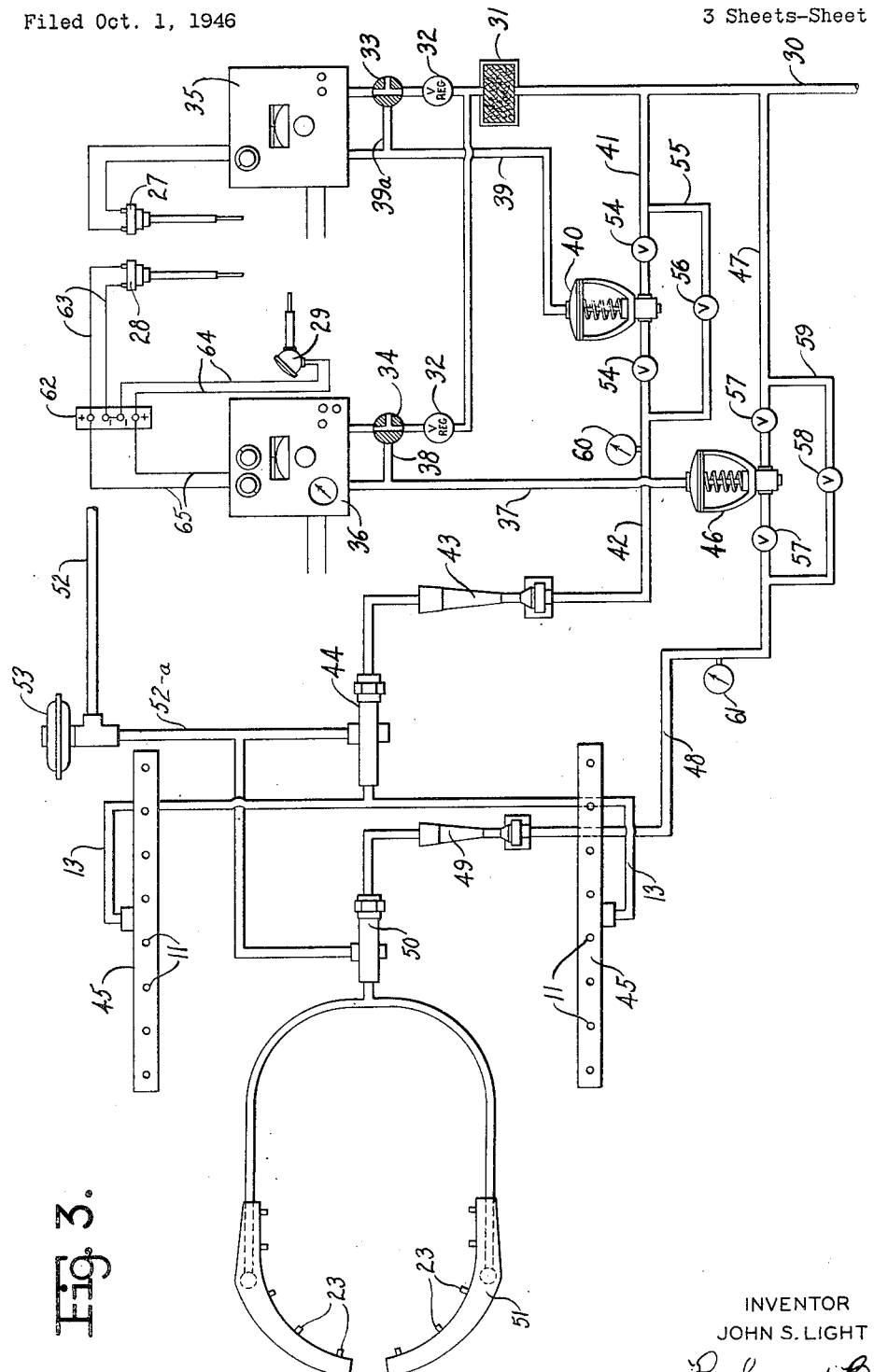
Fig. 3 is a schematic drawing showing the details of the control system for regulating the temperature conditions in the homogenizing section and spout.

Fig. 3 shows schematically the regulating and control means for automatically regulating the temperature conditions in the homogenizing and spout sections of the forehearth. Air from any suitable source of compressed air enters inlet pipe 30 and a portion of the inlet air is conducted to an air filter 31. After passing through the filter, the clean, filtered air is distributed through a branched system to two pressure regulating valves 32 by which the inlet air pressure is reduced to some predetermined desired value. Pressure regulated air is fed through two three-way valves 33 and 34 to a pneumatic indicating controller 35 and a differential temperature balance controller 36, respectively. Units 35 and 36 function somewhat like pressure regulating valves to control the firing of the homogenizing section and spout burners, respectively, in response to the thermo-electrical output of thermocouples 27, 28 and 29, as will be described more fully presently. Controlled and regulated air leaves the pneumatic indicating controller 35 by means of pipe line 39 and is fed to a pneumatic valve 40 which is opened and closed proportionately by the air pressure in pipe line 39. A branch line 41 feeds inlet air from inlet pipe 30 to pneumatic valve 40. The pressure and flow of air is regulated by the valve 40 in response to the pressure in line 39 and, after being so regulated, flows by pipe line 42 to inspirator 43 where atmospheric air is drawn into the air stream to supplement the air being passed and regulated by valve 40. The combined air flows from inspirator 43 to inspirator or mixer 44 where a predetermined amount of illuminating gas or other suitable combustible gas is drawn into the combined air stream. The combustible gas and air mixture is fed through lines 13 to manifolds 45 which distribute the combustible mixture to the homogenizing section burners 11.

Controlled air leaves the differential temperature balance controller 36 by means of pipe line 37 and is fed to pneumatic valve 46, the operation of which is identical in function with that of pneumatic valve 40. Inlet air is conducted from inlet pipe 39 through branch pipe 47 to pneumatic valve 46 by which valve the pressure of the air is reduced proportionate to the air pressure in pipe line 37. The regulated air is thereafter conducted by pipe line 48 to inspirator 49 where atmospheric air is drawn into the air stream and then to inspirator or mixer 50 where gas is drawn into the combined air stream. The combustible mixture is then conveyed to manifolds 51 from which combustible mixture is fed to the spout burners 23. The combustible gas for both homogenizing and spout systems is introduced through inlet pipe 52 to a pressure regulator 53 which reduces the gas pressure in line 52—a to substantially atmospheric pressure. The gas, when so regulated is fed through a branched system to the inspirators 44 and 50.

Two hand valves 54 may be located in the pipe lines 41 and 42 on either side of pneumatic valve 40. A by-pass line 55 and a valve 56 therein may be provided in the system so that air may be permitted to by-pass valve 40 by a suitable manipulation of hand valves 54 and 56. Thus, if valves 54 are closed tightly and valve 56 is opened suitably, pneumatic valve 40 can be rendered totally ineffective and may be removed from the system for cleaning, repairing or adjustment. With this method of operation, the regulation of air pressure to the homogenizing burners and the associated gas introduced in the system is entirely controlled manually by the furnace operator's manipulation of by-pass valve 56. Valves 57 and 58 may be provided in pipe lines 47 and 48 and a by-pass line 59 may be provided in a manner and for a purpose similar to that hereinbefore described with reference to valves 54 and 56 and by-pass 55. Pressure indicating gauges 60 and 61 may be placed in pipe lines 42 and 48, respectively, to indicate the pressure of the air stream being fed to inspirators 43 and 49, respectively. Three-way valves 33 and 34 may be adjusted so that pressure regulated air from regulating valves 32 may be passed directly to pneumatic valves 40 and 46 by means of by-pass lines 39a and 38, respectively.

Certain details of the thermocouple control system should be noted. As indicated on terminal mounting plate 62, the thermocouple lead wires 63 and 64 from thermocouples 28 and 29, respectively, are connected in opposed polarity. Lead wires 65, connecting terminal plate 62 with balance controller 36, will then bear a potential proportional to the temperature difference between thermocouples 28 and 29 and of a suitable polarity corresponding to the temperature gradient between the thermocouples. Thus, if the junction of thermocouple 29 should be in a region of molten glass having a temperature 40 degrees below the temperature that thermocouple 28 is being subjected to, a potential proportionate to this temperature difference and of a suitable polarity will be fed to controller 36 by lead wires 65. If thermocouple 29 should be subjected to a temperature 40 degrees higher than the temperature of thermocouple 28, a potential of identical magnitude but reversed polarity would be fed to controller 36 by lead wires 65. The action of controller 36 is to regulate the pressure of the air being fed to pneumatic valve 46 by line 37 to a value proportional to the potential in lead wires 65. Thus, the opening and closing of valve 46 will be a function of the temperature difference between thermocouples 28 and 29 and the flow of combustible mixture to the spout burners will be suitably regulated to maintain the temperature difference to a predetermined value.

As is well known in the field of pyrometry, lead wires 63 and 64 may be continuations of the thermocouple wires which, in the embodiment disclosed, are platinum in conjunction with an alloy composed of 90% platinum and 10% rhodium but may be any of a variety of commercially available thermocouple materials. In this way, the junction between the thermocouple lead wires and lead wires 65 of dissimilar metal can be removed to a region of small temperature variation. Extraneous variations of the potential of the thermocouple system can thereby be eliminated. The lead wires 65 from the terminal plate 62 to controller 36 may be made of copper or other suitable conducting material. Controller 36, being differentially connected to thermocouples 28 and 29, does not require any means for cold junction compensation.

The action of the pneumatic indicating controller 35 is responsive to the potential output of thermocouple 27 and thereby regulates the pressure of the air being fed to pneumatic valve 40 by way of pipe line 39. The opening and closing of valve 40 under the control of controller 35 and in response to the potential output of thermocouple 27 regulates the flow of air to inspirator 43 and thence to the homogenizing section burner system. By setting the controller 35 to any predetermined value, the controller can be made to operate valve 40 and thereby control the heating means in the homogenizing section to maintain in the homogenizing section the temperature set on the controller.

All instruments, control valves, gauges, thermocouples and other associated equipment used in the hereinbefore described system are commercial units and, per se, form no part of the present invention. The pneumatic indicating controller 35 and differential balance controller 36 may be purchased from the C. J. Tagliavue Division of the Portable Products Corporation of Brooklyn, New York.

Thus, the general operation of the herein disclosed system is such that the temperature of the molten glass in the forward end of the homogenizing section of the glass furnace forehearth can be automatically be regulated to a predetermined value. The temperature difference between the molten glass in the forward end of the homogenizing section and in the spout can be regulated to a desirable value. In this way, a reference temperature is established in the glass entering the spout and a temperature gradient from the reference temperature is established in the spout. The maintenance of the reference temperature is effected by thermocouple 27 and its associated systems while the gradient is maintained by thermocouples 28 and 29 and another associated system.

It has been found in practice that glass moves through all sections of the channel 3 to supply the feeder well 19 and in so doing, the glass in the lower cooler section of the channel tends to form the outside portion of the gob being discharged from the well. The glass moving in the upper hotter region of the channel tends to form the central portion of the gob. This combined action results in a polar temperature distribution within the gob, the center portion of the gob being hotter than the outside portions. In itself, this polar distribution of temperature is not normally objectionable and, from certain view points, may even be desirable. However, the rotation of tube 21 produces an adverse effect on the polar distribution of temperatures within the gob resulting in a condition where a side portion of the gob may be hotter than the other portions of the gob.

The glass entering feeder well 19 moves downward by gravity and under the action of plunger 20 and enters the feeder well from all sides with a spiral motion created by the rotation of the tube 21. Certain portions of the glass flowing to the well travel in a relatively long spiral path out around the forward end of the spout, whereas other portions of the glass enter the well along an almost direct path from the forehearth channel. This disparity in length of flow paths causes a temperature difference in the various portions of the glass entering the well, the glass traveling the farthest having the most opportunity for heat transfer and cooling.

Thermocouple 29 is suitably located so as to be in contact with the portions of glass having relatively long flow paths. As shown in Fig. 1, it is desirable in the present embodiment of this invention to locate thermocouple 29 in a portion of the spout remote from homogenizing section, thermocouple 29 being on a radial line approximately 225° from the longitudinal axis of the forehearth in the direction of rotation of tube 21. The action and location of burners 23 is to heat these relatively cool portions of glass such that the glass in all portions of the spout will arrive at the feeder well in relative thermal balance. In this way, temperature variations in the side portions of the gobs are prevented and the thin spot resulting from the hot side portions are eliminated.

The differential setting of controller 36 should be proportional to the temperature decrease experienced by the glass flowing by the shortest path from the forward end of the homogenizing section to the well of the spout.

It is noteworthy than changes of level in the forehearth produce practically no adverse effects on the operation of this system. It is also noteworthy that the desired temperature values can be very easily changed and regulated by suitable manipulation of the controls of units 35 and 36.

The present invention has been disclosed with particular reference to a plunger type feeder for producing gobs individually. The invention may, however, be applied with many attendant advantages to glass feeders of the "double gob" type by which a plurality of suspended charges are formed simultaneously.

Many changes in and modifications of the illustrative embodiment of the invention shown in the accompanying drawings, and particularly described in this specification will now be obvious to those skilled in the art and I therefore do not wish to be limited to the details of such embodiment.

Having thus disclosed an embodiment of my invention, I claim:

1. The method of controlling the temperature of glass of a stream in a forehearth channel at a glass removal point adjacent to the outer end of the channel, comprising the steps of measuring the temperature of glass of the stream at a reference point located a predetermined distance upstream from said glass removal point, heating the glass of the stream passing to said reference point to maintain the temperature there substantially constant at a predetermined level, continuously and directly measuring, the temperature difference between the glass at said reference point and the glass at a further reference point adjacent to the glass removal point, and locally heating the glass of the stream between said reference points according to said measurement to maintain substantially continuously a predetermined temperature difference between these points.

2. In combination, a forehearth comprising a homogenizing section and a spout section continuous therewith, said spout section being formed in its lower portion to define a feeder outlet, a reciprocating plunger and rotatable tube disposed in working disposition to said outlet to control the flow of molten glass through said outlet, heating means associated with said homogenizing section, heating means associated with said spout section, a baffle member disposed between said spout and said homogenizing sections separating the space above a stream of glass flowing from said homogenizing section to said spout section to prevent interference between said homogenizing section and said spout section heating means during their operation, a roof member covering said spout section and having a plurality of spaced vent holes to provide exhaust outlets for said spout section heating means, two vertical thermocouples having their lower ends depending into the glass stream in said homogenizing section adjacent to said baffle, a horizontal thermocouple having its measuring end projecting into the glass stream at a point in said spout outwardly beyond said outlet, means associated with one of said two vertical thermocouples to operate said homogenizing section heating means to maintain a predetermined reference temperature in the glass stream adjacent to said baffle in said homogenizing section, automatic means associated with said second vertical thermocouple and said horizontal thermocouple to maintain a predetermined temperature gradient from said reference temperature between the glass flowing past said first named two vertical thermocouples and the glass flowing past said horizontal thermocouple by operation of said spout section heating means.

3. In combination, a forehearth comprising a homogenizing section and a spout section continuous therewith, said spout section being formed in its lower portion to define a feeder outlet, a reciprocating plunger and rotatable tube disposed in working disposition to said outlet to control the flow of molten glass through said outlet, heating means associated with said homogenizing section, heating means associated with said spout section, a baffle member disposed between said spout and said homogenizing sections separating the space above a stream of glass flowing from said homogenizing section to said spout section to prevent interference between said homogenizing section and said spout section heating means during their operation, a roof member covering said spout section and having means to vent from said spout section products of the spout section heating means, two vertical thermocouples having their lower ends depending into the glass stream in said homogenizing section adjacent to said baffle, a horizontal thermocouple having its measuring end projecting into the glass stream at a point in said spout outwardly beyond said outlet, means associated with one of said two vertical thermocouples to operate said homogenizing section heating means to maintain a predetermined reference temperature in the glass stream adjacent to said baffle in said homogenizing section, automatic means associated with said second vertical thermocouple and said horizontal thermocouple to maintain a predetermined temperature gradient from said reference temperature between the glass flowing past said first named two vertical thermocouples and the glass flowing past said horizontal thermocouple by operation of said spout section heating means.

JOHN S. LIGHT.

REFERENCES CITED

The following references are of record in the file of this patent:

UNITED STATES PATENTS

| Number | Name | Date |
| --- | --- | --- |
| 1,961,894 | Wadman et al. | June 5, 1934 |
| 2,098,625 | Honiss | Nov. 9, 1937 |
| 2,153,922 | Green et al. | Apr. 11, 1939 |